(12) United States Patent
Finn et al.

(10) Patent No.: US 10,767,574 B2
(45) Date of Patent: Sep. 8, 2020

(54) MULTI-FUEL ENGINE AND METHOD OF CONTROLLING THE SAME

(71) Applicants: Finn Associates (Businesscare) Limited, Yorkshire (GB); Merlin Fuel Technology Limited, Yorkshire (GB)

(72) Inventors: Paul Finn, Yorkshire (GB); Pam Wade, Yorkshire (GB); Peter Bower, Yorkshire (GB); Neil Curry, Yorkshire (GB)

(73) Assignees: Finn Associates (Businesscare) Limited, Yorkshire (GB); Merlin Fuel Technology Limited, Yorkshire (GB)

( * ) Notice: Subject to any disclaimer, the term of this patent is extended or adjusted under 35 U.S.C. 154(b) by 22 days.

(21) Appl. No.: 15/779,903

(22) PCT Filed: Oct. 10, 2016

(86) PCT No.: PCT/GB2016/053144
§ 371 (c)(1),
(2) Date: May 30, 2018

(87) PCT Pub. No.: WO2017/093706
PCT Pub. Date: Jun. 8, 2017

(65) Prior Publication Data
US 2018/0363569 A1      Dec. 20, 2018

(30) Foreign Application Priority Data
Nov. 30, 2015   (GB) .................................. 1521071.9

(51) Int. Cl.
*F02D 19/10* (2006.01)
*F02D 41/18* (2006.01)
(Continued)

(52) U.S. Cl.
CPC ........... *F02D 19/10* (2013.01); *F02D 35/027* (2013.01); *F02D 41/0025* (2013.01);
(Continued)

(58) Field of Classification Search
CPC .... F02D 19/06; F02D 19/061; F02D 19/0642; F02D 19/0647; F02D 19/08; F02D 19/10; F02D 41/0027; F02D 41/182
See application file for complete search history.

(56) References Cited

U.S. PATENT DOCUMENTS

| | | | |
|---|---|---|---|
| 2009/0312935 A1* | 12/2009 | Song | F02D 19/0628 701/103 |
| 2010/0180838 A1 | 7/2010 | Lewis, III et al. | |
| 2012/0226426 A1 | 9/2012 | Finn et al. | |
| 2013/0046454 A1 | 2/2013 | Cowgill et al. | |

(Continued)

FOREIGN PATENT DOCUMENTS

| | | |
|---|---|---|
| EP | 2527623 A2 | 11/2012 |
| EP | 2578848 A1 | 4/2013 |

(Continued)

*Primary Examiner* — Sizo B Vilakazi
*Assistant Examiner* — Anthony L Bacon
(74) *Attorney, Agent, or Firm* — Gable Gotwals

(57) ABSTRACT

The invention relates to a multi-fuel engine comprising a primary fuel supply and at least a secondary fuel supply. The primary and at least secondary fuels are arranged to mix with each other and with air for combustion in one or more cylinders of the engine in use. One or more electronic control units (ECU) are provided to control one or more supply characteristics of the primary and/or at least secondary fuel(s) in use. The engine includes a mass air flow (MAF) sensing means. At least one of the ECUs is arranged to receive one or more signals from the MAF sensing means to control, at least partially, one or more supply characteristics of the primary fuel. In addition, the ECU and/or a further ECU is arranged to receive one or more signals from
(Continued)

the MAF sensing means to control, at least partially, one or more supply characteristics of the at least secondary fuel.

16 Claims, 6 Drawing Sheets

(51) Int. Cl.
    *F02D 41/00*     (2006.01)
    *F02D 35/02*     (2006.01)

(52) U.S. Cl.
    CPC ......... *F02D 41/0027* (2013.01); *F02D 41/18* (2013.01); *F02D 2200/021* (2013.01); *F02D 2200/0404* (2013.01); *F02D 2200/0406* (2013.01); *F02D 2400/11* (2013.01); *Y02T 10/36* (2013.01)

(56) References Cited

U.S. PATENT DOCUMENTS

| | | | |
|---|---|---|---|
| 2013/0220270 A1* | 8/2013 | Imai | F02D 41/266 |
| | | | 123/294 |
| 2013/0340717 A1* | 12/2013 | Avery | F02D 41/30 |
| | | | 123/478 |
| 2015/0025774 A1* | 1/2015 | Green | F02D 41/30 |
| | | | 701/103 |
| 2015/0354492 A1* | 12/2015 | Surnilla | F02D 41/0002 |
| | | | 123/349 |
| 2017/0089285 A1* | 3/2017 | Takigawa | F02D 41/0027 |
| 2017/0122226 A1* | 5/2017 | Lutz | B01D 53/9495 |

FOREIGN PATENT DOCUMENTS

| | | |
|---|---|---|
| JP | 2006104941 A | 4/2006 |
| WO | 2010125396 A2 | 11/2010 |

* cited by examiner

Table 1 - Trial 1

IFS Trialing results of Transit Connect
Runs 1 - 14 demonstrating level of savings in fuel costs and reduction in combined thermal energy burn prior to incorporation of new "IAF Series" technology into the IFS dual-fuel conversion

| Run | 50.0; 100 | 49.47; 100 | 48.11; 100 | Combined Average % | % Diesel reduction | % Thermal energy burn variance |
|---|---|---|---|---|---|---|
| 1 | 9.56 | 10.16 | 10.76 | 10.16 | 32.26 | -4.12 |
| 2 | 10.11 | 10.65 | 11.19 | 10.65 | 30.48 | -5.23 |
| 3 | 5.75 | 6.41 | 7.08 | 6.41 | 30.81 | 0.26 |
| 4 | 13.34 | 14.35 | 15.39 | 14.36 | 51.93 | -4.09 |
| 5 | 12.98 | 14.02 | 15.07 | 14.02 | 52.40 | -3.83 |
| 6 | 12.92 | 13.94 | 14.99 | 13.95 | 51.97 | -3.56 |
| 7 | 12.84 | 13.88 | 14.94 | 13.89 | 52.37 | -3.37 |
| 8 | 13.29 | 14.33 | 15.39 | 14.34 | 52.98 | -3.78 |
| 9 | 13.22 | 14.26 | 15.32 | 14.27 | 52.78 | -3.74 |
| 10 | 12.65 | 13.69 | 14.76 | 13.70 | 52.51 | -3.10 |
| 11 | 10.17 | 10.97 | 11.79 | 10.98 | 40.77 | -2.84 |
| 12 | 12.74 | 13.94 | 15.17 | 13.95 | 58.53 | -1.77 |
| 13 | 11.84 | 12.70 | 13.58 | 12.71 | 44.82 | -3.83 |
| 14 | 7.82 | 8.83 | 9.87 | 8.84 | 46.66 | 1.49 |
| | 159.23 | 172.12 | 185.30 | 172.22 | 631.27 | -41.31 |

Net average % savings (172.22 ÷ 14) 12.30 46.52 -2.95

FIG 4

Table 2 - Trial 2

JFS Trialling results of Transit Connect
Runs 15-28 incorporating "MAF Sensor" technology

| Run | 50.8:100 | 49.47:100 | 48.11:100 | Combined Average % | % Diesel reduction | % Thermal energy burn variance |
|---|---|---|---|---|---|---|
| 15 | 19.33 | 20.53 | 21.75 | 20.54 | 65.02 | -8.38 |
| 16 | 20.56 | 21.74 | 22.94 | 21.75 | 65.42 | -9.81 |
| 17 | 21.32 | 22.46 | 23.64 | 22.47 | 65.22 | -10.79 |
| 18 | 18.26 | 19.60 | 20.98 | 19.61 | 69.87 | -5.88 |
| 19 | 17.75 | 19.10 | 20.49 | 19.11 | 69.46 | -5.35 |
| 20 | 19.25 | 20.58 | 21.94 | 20.59 | 70.10 | -7.06 |
| 21 | 17.46 | 18.62 | 19.81 | 18.63 | 61.67 | -6.87 |
| 22 | 18.00 | 19.19 | 20.40 | 19.20 | 63.48 | -7.09 |
| 23 | 20.40 | 21.57 | 22.77 | 21.58 | 65.25 | -9.65 |
| 24 | 19.87 | 21.15 | 22.45 | 21.16 | 68.73 | -8.15 |
| 25 | 20.83 | 22.15 | 23.50 | 22.16 | 71.37 | -8.71 |
| 26 | 18.56 | 19.90 | 21.26 | 19.91 | 69.53 | -6.34 |
| 27 | 19.94 | 21.19 | 22.46 | 21.19 | 67.56 | -8.52 |
| 28 | 20.54 | 21.70 | 22.88 | 21.71 | 64.78 | -9.94 |
| | 272.07 | 289.47 | 307.27 | 289.60 | 937.46 | -112.54 |

Net average % savings    (289.62÷14)    20.69

Net average % savings 1-14    12.30

Uplift following MAF Sensor control application    8.39

Equivalent to an increase in putative fuel cost savings of 68.21%

| Average % reduction | 15-28 | 66.96 | -8.04 |
|---|---|---|---|
| | 1-11 | 46.52 | -2.95 |
| | | 20.44 | -5.09 |

Equivalent to an overall reduction/improvement of    43.94%    172.54%

FIG 5

MULTI-FUEL ENGINE AND METHOD OF CONTROLLING THE SAME

CROSS-REFERENCE TO RELATED APPLICATIONS

This application is the United States National Phase of patent application Ser. No. PCT/GB2016/053144 filed 10 Oct. 2016, which claims priority to British Patent Application No. 1521071.9 filed 30 Nov. 2015, each of which are incorporated herein by reference.

BACKGROUND OF THE INVENTION

This invention relates to a multi-fuel engine and to a method for controlling a multi-fuel engine.

Although the following description refers almost exclusively to a dual fuel engine in the form of a diesel/gas engine, it will be appreciated by persons skilled in the art that the apparatus and method of the present invention could be used to control any engine that is arranged to be capable of using two or more different fuels during operation.

Dual fuel engines that use a primary fuel and at least a secondary fuel have been used for many years and offer a number of advantages over single fuel engines. Many of these engines use diesel as the primary fuel and a gas, such as liquid petroleum gas (LPG) or compressed natural gas (CNG), as the secondary fuel. The secondary fuel or gas is typically a lower cost fuel relative to the primary fuel and therefore provides an overall cost advantage as less primary fuel is utilised during operation of the engine. In addition, combusting two fuels together can result in a more complete combustion of the primary fuel, thereby reducing the number of particulates in the exhaust emission. Thus, there is potential for environmental benefits, cost benefits and engine performance improvements by using a multi-fuel engine compared to a single fuel engine.

The amount of primary and secondary fuel introduced into a cylinder of an engine is typically controlled by an electronic control unit (ECU) associated with the engine. The ECU can be an original equipment manufacturer (OEM) ECU and/or can be a further ECU that is retrofitted into the engine when a diesel only or primary fuel only engine is converted to a dual fuel or multi-fuel engine. The ECU, in whichever form it takes, receives a plurality of signals from a number of different sensors provided in the engine and, based on these signals, the ECU determines the amount of primary and/or secondary fuel introduced into the engine cylinder(s).

An example of a dual fuel engine is referred to in the Applicant's earlier patent application WO2010125396, the contents of which are incorporated herein by reference, and as illustrated in FIGS. 1a and 1b. The engine 2 is a four cylinder diesel engine which has been converted to run on a combination of diesel (the primary fuel) and LPG (the secondary fuel). Diesel is supplied from a tank 4 by a fuel pump 6 into each cylinder 8 using diesel injectors 9. The rate of flow of the diesel in the diesel line 10 is monitored by a diesel flow meter 11 and a diesel pressure monitor 12. Air, for use in combusting the fuel, is drawn from an air intake valve 14. LPG is supplied in liquid form from a tank 16 to a gas supply valve 18. The LPG flow rate is measured by flow meter 19. The LPG is then passed to a vaporiser 20, where it is changed into a gaseous state, before being directed to gas injectors 22 for injection into the four cylinders 8. The gas injectors are located in an air inlet manifold in a region adjacent to the air inlet valve 14 of each cylinder so as to mix with the air prior to injection into the cylinders. The quantity of LPG delivered to the cylinders is controlled by injector control means or module 24.

An ECU 26 controls the gas supply valve 18 and the gas injector module 24. ECU 26 is in addition to the conventional OEM ECU unit (not shown) associated with the engine. The ECU 26 takes signals from various sensors located in the engine or from the OEM ECU and uses these signals to control the diesel and/or the gas supply. For example, the ECU can receive signals output from one or more throttle position sensors (TPS) 28, manifold pressure sensors (MAP) 30, knock sensors 32, crank or cam shaft position (CAM) sensors 34 for r.p.m information, thermometers 36 for detecting the vaporiser temperature, throttle motors 40, together with signals from the diesel flow meter 11 and the diesel pressure monitor 12. Many or all of the sensors are typically installed in the engine during the conversion of the single fuel diesel engine into the dual fuel engine, together with the ECU 26, the gas injectors 22, the LPG tank 16 and the vaporiser 20. An interface port 42 is provided to allow the ECU 26 to connect to a computer via USB or Ethernet for set up, monitoring and diagnostics. The ECU 26 includes processing means or a processor and power supply means to power the ECU. A stepper driver circuit and an injector driver circuit can also be provided if required.

In the engine disclosed in WO2010/125396, the supply of both the primary and secondary fuels is actively managed by the ECU 26 in the engine in accordance with desired engine performance characteristics. In particular, the supply of the primary fuel is actively reduced when the secondary fuel is supplied to the engine. For example, the ECU 26 applies a control signal to LPG injection control module 24 which controls the four LPG injectors 22 so as to deliver gas in a quantity and at a timing determined by the ECU 26 based on the measured parameters referred to above.

Referring to FIG. 1b, a combustion cycle for the duel fuel engine is shown in one embodiment. An engine cylinder 8 is represented schematically at the top of the diagram. Piston 50 reciprocates in the cylinder 8. The cylinder has an inlet valve 52 for allowing air in through an inlet manifold branch 56 and an exhaust valve 54 for expelling exhaust gases through an outlet manifold branch 58. Diesel injector 9 is arranged to spray diesel into the cylinder 8 at an upper region thereof.

The four stroke cycle of the cylinder 8 is depicted by the timeline at the bottom of FIG. 1b, which includes the four sections: induction 60, compression 62, power 64 and exhaust 66. An LPG injector 22 injects LPG in the region of the inlet manifold 56 immediately upstream of the air inlet valve 52. Alternatively, the LPG injector could be arranged to inject LPG into the cylinder when the air inlet valve 52 is open, as well as in the region of the air inlet manifold outside the valve 52 while the valve 52 is closed. As can be seen from the timing information at the bottom of FIG. 1b, the region of the inlet manifold 56 is fumigated with the LPG continuously throughout the four strokes. The LPG mixes with the air and is drawn into the cylinder 8 when the air inlet valve 52 is open from 0 degrees until just after 180 degrees.

The air inlet valve 52 is already open slightly before the induction stroke 60, which begins at 0 degrees and air is drawn into the cylinder 8. The exhaust valve 54 closes momentarily afterwards and remains closed until shortly before the power stroke 64 ends. The compression stroke 62 begins at 180 degrees and soon thereafter the inlet valve 52 closes. Towards the end of the compression stroke 62 the diesel fuel is injected by the injector 9 and mixes with the air. At 360 degrees the power stroke 64 begins as the diesel fuel/air mixture ignites under pressure and the resulting rapid expansion of gases during combustion drives the piston 50. Shortly before the power stroke 64 is finished, the exhaust valve 54 opens and the exhaust stroke 80 begins at 540 degrees. The exhaust valve 54 remains open until shortly after the exhaust stroke 80 ends (720 degrees) allowing the combustion products to be pushed out of the cylinder by the rising piston.

The ECU 26 is arranged to control the pressure of the diesel rail. It does this by altering the signal from the OEM ECU which controls the diesel supply pressure, so as to reduce it, and which at the same time provides to the OEM ECU an emulation signal which represents an expected sensed diesel pressure of an unaltered diesel supply. This has the effect of reducing the amount of diesel supplied to the cylinder. Although this system works well, there is a limit to the engine efficiency that can be achieved.

It is therefore an aim of the present invention to provide a multi-fuel engine that results in improved engine efficiency and fuel cost savings.

It is a further aim of the present invention to provide a method of controlling a multi-fuel engine resulting in improved engine efficiency and fuel cost savings.

According to a first aspect of the present invention there is provided a multi-fuel engine, said multi-fuel engine comprising a primary fuel supply and at least a secondary fuel supply, the primary and at least secondary fuels being arranged to mix with each other and with air for combustion in one or more cylinders of the engine in use, one or more electronic control units (ECU) are provided to control one or more supply characteristics of the primary and/or at least secondary fuel(s) in use, said engine including a mass air flow (MAF) sensing means, and at least one of said ECUs is arranged to receive one or more signals from the MAF sensing means to control, at least partially, one or more supply characteristics of the primary fuel, characterised in that the ECU and/or a further ECU is arranged to receive one or more signals from the MAF sensing means to control, at least partially, one or more supply characteristics of the at least secondary fuel.

Thus, in accordance with the present invention, the multi-fuel engine uses one or more signals from the MAF sensing means to at least partially control one or more supply characteristics of the secondary fuel, in addition to normal use of the MAF sensing means for controlling one or more supply characteristics of the primary fuel. Use of the MAF sensing means to control both primary and secondary fuels results in a significant increase in the efficiency of the engine. For example, experimental data suggests cost savings of engines running without a load of 20-24%, reduction of the primary diesel fuel used by the engine of approximately 70% and a reduction of the combined fuel energy use of approximately 11%. Vehicles in which the engine of the present invention has been tested have also been shown to have more controllable power without detriment to the "driveability" of the vehicles.

The present invention has the advantage over prior art dual fuel engine systems in that no modifications need to be made to the air inlet manifold in order for the present invention to function. The present invention is utilizing the signals emitted from the existing MAF sensor provided in the engine to control the secondary fuel supply. In addition, the present invention can be set up remotely and so reduces the set up costs associated with the same.

A mass air flow (MAF) sensing means or sensor is typically used to calculate the mass flow rate of air entering or being input into a fuel injected internal combustion engine. The one or more signals output from the MAF sensing means are necessary conventionally for the OEM ECU to balance and deliver the correct primary or diesel fuel mass to the engine. Air changes its density as it expands, and the air density varies with changes in temperature and pressure. In automotive applications, air density varies with the ambient temperature, altitude and the use of forced induction. As such, MAF sensing means are more appropriate than volumetric flow sensors for determining the quantity of intake of air in each cylinder. The MAF sensing means typically conventionally provides the OEM ECU with open-loop predicted air flow data (measured air flow data), and other sensing means provided in the engine, such as for example an oxygen sensor, can provide closed-loop feedback in order to make minor corrections to the predicted air mass.

Preferably the MAF sensing means is any sensor or sensing means that can determine the mass of air flow being input into an engine and/or a cylinder of an engine. For example, the MAF sensing means could include a vane meter sensor, a hot wire sensor and/or the like.

Preferably the MAF sensing means or sensor is fitted to a suction side of a combustion air inlet means or system of the engine.

Preferably the ECU and/or further ECU is arranged so as to be able to automatically detect which type of MAF sensing means is fitted in the engine and use and/or adjust one or more calculations it will use for controlling the secondary fuel supply accordingly. Thus, in one example, the ECU and/or further ECU may be capable of utilising two or more different calculations, formula and/or algorithms and, based on the type of MAF sensing means it detects, it determines which one of the two or more different calculations, formula and/or algorithms it will use.

In a preferred embodiment the MAF sensing means includes a hot wire or hot wire sensor, and also a temperature sensor. This type of sensing means typically works by the engine ECU and/or further ECU attempting to maintain a wire element at a pre-determined temperature by supplying a variable current to the wire element. As air flows over the MAF sensing means or sensor, the wire element is cooled and the temperature drops so more current is required to maintain the temperature. The amount of current being used to maintain the temperature of the wire element is measured by the ECU and/or further ECU and is proportional to the airflow entering the engine. Conventionally, the engine ECU uses this data, together with other data inputs, to calculate the required primary or diesel fuel rate necessary for the engine load conditions at any given time.

Preferably the MAF sensing means or sensor outputs one or more pulse width modulation (PWM) signals in use and said one or more PWM signals are used by the ECU and/or further ECU to control one or more supply characteristics of the secondary fuel.

In one embodiment the ECU and/or the further ECU receives the one or more signals directly from the MAF sensing means. In an alternative embodiment the ECU and/or further ECU receives the one or more signals from the MAF sensing means indirectly via the vehicle Controller Area Network (CAN) data. The latter embodiment has the advantage that no new hard wiring is required between the ECU and/or further ECU and the MAF sensor or sensing means in a retro-fit to an existing OEM ECU. The latter embodiment has the disadvantage that the MAF signal data needs to be decoded and separated out from other sensor data prior to being used by the ECU.

Preferably the primary fuel is diesel.

Preferably the at least secondary fuel is any or any combination of combustible gas, liquid petroleum gas (LPG), compressed natural gas (CNG) and/or the like.

Preferably the one or more supply characteristics of the at least one secondary fuel being controlled, at least partially, by the one or more signals received by the ECU and/or further ECU from the MAF sensing means consists of or includes the volume of the secondary fuel being injected into the one or more engine cylinders, the duration of injection of the secondary fuel into the one or more engine cylinders and/or the like.

The at least one secondary fuel can be injected into an air intake stream for an engine cylinder prior to a turbocharger associated with one or more engine cylinders or directly into an air inlet manifold in front of, at the location of, or upstream of one or more cylinder head inlet ports.

Preferably secondary fuel injection means are provided to inject the secondary fuel into the engine at the desired location. The secondary fuel injection means typically include one or more injectors or gas injectors.

One or more secondary fuel injection means, injectors or gas injectors can be used at one or more locations within the engine dependent on the number of engine cylinders and/or the cubic capacity of the engine. For example, a single secondary fuel injector can used for each engine cylinder.

Preferably one or more sensors other than the MAF sensor are provided in or associated with the engine and one or more signals emitted from the one or more other sensors are input or communicate with the ECU and/or further ECU to allow control of one or more of, or the, supply characteristics of the primary and/or secondary fuels.

The one or more other sensors can include any or any combination of fuel line pressure monitoring means, primary or diesel rail pressure sensor, primary or diesel fuel injection duration sensor/timing means, boost pressure sensor and/or the like.

Preferably the ECU and/or further ECU receiving the MAF signals for controlling the one or more supply characteristics of the secondary fuel undertakes one or more safety checks in respect of the delivery of the secondary fuel in the engine. The one or more safety checks can include any or any combination of measuring the secondary fuel temperature at one or more locations in the engine, such as for example measuring the temperature at secondary fuel vaporising means; measuring the amount of a secondary fuel in a secondary fuel reservoir in or associated with the engine from which the secondary fuel is supplied in use; the boost pressure measured by a boost pressure sensor located in the inlet manifold of the turbo charger and/or the like.

Preferably each safety check and/or measurement has a safety threshold limit or range associated with the same, such that if said safety threshold limit or range is exceeded, the engine and/or the supply of the primary or secondary fuels to the engine is stopped.

In one embodiment, the one or more other sensors and/or measurements for controlling one or more supply characteristics of the secondary fuel (in addition to the air inlet MAF signals) are any or any combination of the primary or diesel fuel rail pressure, the primary or diesel fuel injector measurement (i.e. duration of injection in time), the boost pressure and/or the like.

Preferably the secondary fuel temperature is taken at vaporising means associated with the secondary fuel supply which allows the secondary fuel to be converted from a liquid form to a gaseous form. Preferably the vaporising means are provided in the secondary fuel supply line.

Preferably the primary fuel is stored or is supplied from a primary fuel reservoir, tank, container means and/or the like.

Preferably the secondary fuel is stored or is supplied from a secondary fuel reservoir, tank, container means and/or the like.

Preferably the amount of secondary fuel contained in the secondary fuel reservoir is measured by sensing means provided in or associated with the secondary fuel reservoir.

Preferably the primary fuel rail pressure is measured by pressure sensing means provided in the primary fuel supply line. The pressure sensing means is typically provided between the primary fuel reservoir and the primary fuel injection means associated with a cylinder in the engine.

Preferably the secondary fuel injection measurement is taken from a secondary fuel injection module. The secondary fuel injection module is associated with one or more secondary fuel injectors or injection means for injecting the secondary fuel into a cylinder of the engine.

Preferably the boost pressure is measured by a boost pressure sensor located in the inlet manifold on the pressure side of the turbo charger. The boost pressure typically has the function of at least partially controlling the supply of the primary and/or secondary fuel into the engine cylinders and acting as a safety check to prevent over-fuelling of the engine with the secondary fuel.

Preferably the ECU and/or further ECU is arranged to process the one or more signals from the MAF sensing means in real time.

Preferably the ECU and/or further ECU is arranged to use one or more formula, calculations and/or algorithms to calculate one or more supply characteristics of the secondary fuel, such as for example, the injection duration of the secondary fuel.

The calculation typically takes one or more measurements or "values" from one or more of the sensors in the engine and applies a weighting or biasing effect, "scalar" and/or "offset" to the same. In this way, the amount of secondary fuel being supplied to the engine can be adjusted or weighted in favour of one or more sensor signals as required. In addition, the "scalar" and/or "offset" values can take account of different sensors supplied by different manufacturers.

The "values" used in the calculation can be varied as required. For example, in one embodiment, the calculation can include values relating to the MAF signal data, the primary fuel rail pressure, the primary fuel injection duration, the boost pressure and/or the like.

Preferably each "scalar" and/or "offset" value has an upper and/or a lower threshold value, thereby preventing or substantially preventing a "scalar" and/or "offset" value being applied that would result in an unsafe secondary fuel injection duration being output by the ECU and/or further ECU for use by the engine.

Preferably the one or more signals from the MAF sensing means are input into the algorithm or formula to calculate one or more supply characteristics of the secondary fuel.

In one embodiment the calculation for deriving the overall secondary fuel injection duration of the secondary fuel via the secondary fuel injection means is based on the following:

$$\text{Calculated Output Value} = (\text{Value 1} + \text{Value 2} + \text{Value 3}) \times \text{Scalar 4}$$

Wherein:

$$\text{Value 1} = (\text{MAF} - \text{Offset 1}) \times \text{Scalar 1}$$

$$\text{Value 2} = (\text{Primary Fuel Rail} - \text{Offset 2}) \times \text{Scalar 2}$$

$$\text{Value 3} = (\text{Primary Fuel Injector Duration} - \text{Offset 3}) \times \text{Scalar 3}$$

Where:
Scalar 1=MAF Multiplier
Offset 1=MAF Offset
Scalar 2=Primary Fuel Rail pressure multiplier
Offset 2=Primary Fuel Rail pressure offset
Scalar 3=Primary Fuel Injector duration multiplier
Offset 3=Primary Fuel Injector duration offset
Scalar 4=Global scalar Conversion of the Calculated Output Value to a Secondary Fuel Injector Output Duration (in seconds) requires multiplication by a scalar based on the hardware platforms time constant (i.e. a timing value relating to the processor of the ECU), as shown below.

$$\text{Injector Output Duration} = \text{Calculated Output Value} \times \text{HardwareTimeScalar}$$

In one embodiment the calculation for deriving the overall LPG injection duration of the LPG fuel via the LPG injection means is based on the following:

$$\text{LPG Injection Duration Time (milliseconds)} = (\text{MAF} \times \text{Scalar}) + \text{Offset}) \times \text{Mixture} \times \text{LPG Ratio} \times \text{LPG Cal}$$

Where:
MAF=MAF sensor measurement value;
LPG Injection Duration=length of time an LPG injector needs to be open in order to deliver the desired amount of LPG to a cylinder of the engine in use;
Scalar, Offset=MAF frequency to pounds-per-hour conversion;
Mixture=best power-mixture-value for the LPG;
LPG ratio=Desired fuel ratio (user configurable)
LPG Cal=Fuel flow in pounds-per-hour to injector open time (milliseconds) calibration.

In one embodiment, the one or more formula, calculations and/or algorithms used by the ECU and/or further ECU to measure the duration time for which the secondary fuel injector means is open for each cylinder cycle in the engine is $$\text{SF Injection Duration Time (milliseconds)} = (\text{MAF} \times \text{Scalar}) + \text{Offset}) \times \text{Mixture} \times \text{SF Ratio} \times \text{SF Cal}$$

Where:
MAF=MAF sensor measurement value;
Secondary Fuel (SF) Injection Time Duration=length of time a secondary fuel injector means needs to be open for in order to deliver the desired amount of secondary fuel to a cylinder per cylinder cycle of the engine in use;
Scalar, Offset=MAF frequency to pounds-per-hour conversion;
Mixture=best power-mixture-value for the secondary fuel;
SF ratio=Desired secondary fuel ratio (user configurable)
SF Cal=Fuel flow in pounds-per-hour to injector open time (milliseconds) calibration.

Preferably the ECU and/or the further ECU calculates a supply characteristic of the secondary fuel that is proportional to the mass of air flow being measured by the MAF sensing means. Thus, data from the MAF sensing means, in one embodiment, can be used by the ECU and/or a further ECU to control, at least partially, the supply of the secondary fuel in the same manner (i.e. directly proportionally) as the supply of the primary fuel by the ECU, further ECU and/or the OEM ECU.

Preferably means are provided to dampen the reaction time associated with the constantly varying signal output by the ECU and/or further ECU for controlling the secondary fuel injection duration and/or other supply characteristics of the secondary fuel. This allows an increase in secondary fuel injection duration to be dampened, slowed or smoothed out to avoid or prevent over fuelling of the engine with the secondary fuel on hard acceleration of a vehicle in which the engine is driving/located in use, while allowing relatively long duration of secondary fuel injection at relatively steadier acceleration or cruising/relatively constant speed of the vehicle. This improves the "driveability" of the vehicle and allows high primary or diesel fuel substitution rates.

The dampening means, in one embodiment, can be any or any combination of one or more values, scalar values or offset values (such as one or more integer values for example) fed into the calculation, formula and/or algorithm performed by the ECU and/or further ECU to measure the secondary fuel injection duration and/or other supply characteristic of the secondary fuel.

Preferably the engine is used in an automotive application or a vehicle, such as for example a car, lorry, van and/or the like.

In one embodiment the engine is a four cylinder engine.

In one embodiment a single ECU is provided and is an original equipment manufacturer (OEM) ECU. In this embodiment the OEM ECU uses the one or more signals from the MAF sensor to control, at least partially, both the primary and secondary fuel supply to the engine.

In an alternative embodiment the ECU is a further or different ECU to the OEM ECU. The further ECU is typically fitted during conversion of a vehicle from using a single fuel engine to using a dual or multi-fuel engine. In this latter embodiment, the OEM ECU uses one or more signals from the MAF sensing means to control, at least partially, the supply of the primary fuel to the engine, and the further ECU uses one or more signals from the MAF sensing means to control, at least partially, the supply of the secondary fuel to the engine. It is to be noted that in one embodiment the further ECU can also be used to utilise one or more signals from the MAF sensing means to control, at least partially, the supply of the primary fuel to the engine.

Preferably the further ECU is arranged to control the pressure of the primary fuel rail or supply line. It can do this by altering the signal from the OEM ECU which controls the primary fuel supply pressure, so as to reduce it, and which at the same time provides to the OEM ECU an emulation signal which represents an expected sensed primary fuel pressure of an unaltered primary fuel supply. This has the effect of reducing the amount of primary fuel supplied to an engine cylinder.

Preferably the further ECU uses data emitted from one or more sensors already existing in the engine in order to control, at least partially or wholly, the secondary fuel supply to the engine. According to a second aspect of the present invention there is provided a method of controlling a multi-fuel engine, said multi-fuel engine comprising a primary fuel supply and at least a secondary fuel supply, the primary and at least secondary fuels being arranged to mix with each other and with air for combustion in one or more cylinders of the engine in use, one or more electronic control units (ECU) are provided to control one or more supply characteristics of the primary and/or at least secondary fuel(s) in use, said method including the steps of measuring mass air flow in the engine using a mass air flow (MAF) sensing means, using the mass air flow measurement to control, at least partially, one or more supply characteristics of the primary fuel via one of the ECUs, characterised in that the method also includes the steps us using the mass air flow measurement to control, at least partially, one or more supply characteristics of the at least secondary fuel using the ECU and/or a further ECU.

According to a third aspect of the present invention there is provided a dual fuel engine comprising a primary fuel supply and a secondary fuel supply. Preferably the primary fuel supply is diesel and the secondary fuel supply is a gas, LPG, CNG and/or the like.

According to further independent aspects of the present invention there is provided apparatus for controlling a multi-fuel engine; and a method of controlling a multi-fuel engine.

According to a further aspect of the present invention there is provided a multi-fuel engine comprising a diesel fuel supply and at least a secondary fuel supply, the diesel and at least secondary fuels being arranged to mix with each other and with air for combustion in one or more cylinders of the engine in use, one or more electronic control units (ECU) are provided to control one or more supply characteristics of the diesel and/or at least secondary fuel(s) in use, said engine including a mass air flow (MAF) sensing means, characterised in that the ECU and/or a further ECU is arranged to receive one or more signals from the MAF sensing means to control, at least partially, one or more supply characteristics of the at least secondary fuel.

Embodiments of the present invention will now be described with reference to the following Figures, wherein:

FIG. 4 shows the results of Trial 1 in Table 1.

FIG. 5 shows the results of Trial 2 in Table 2.

Figure 1A:
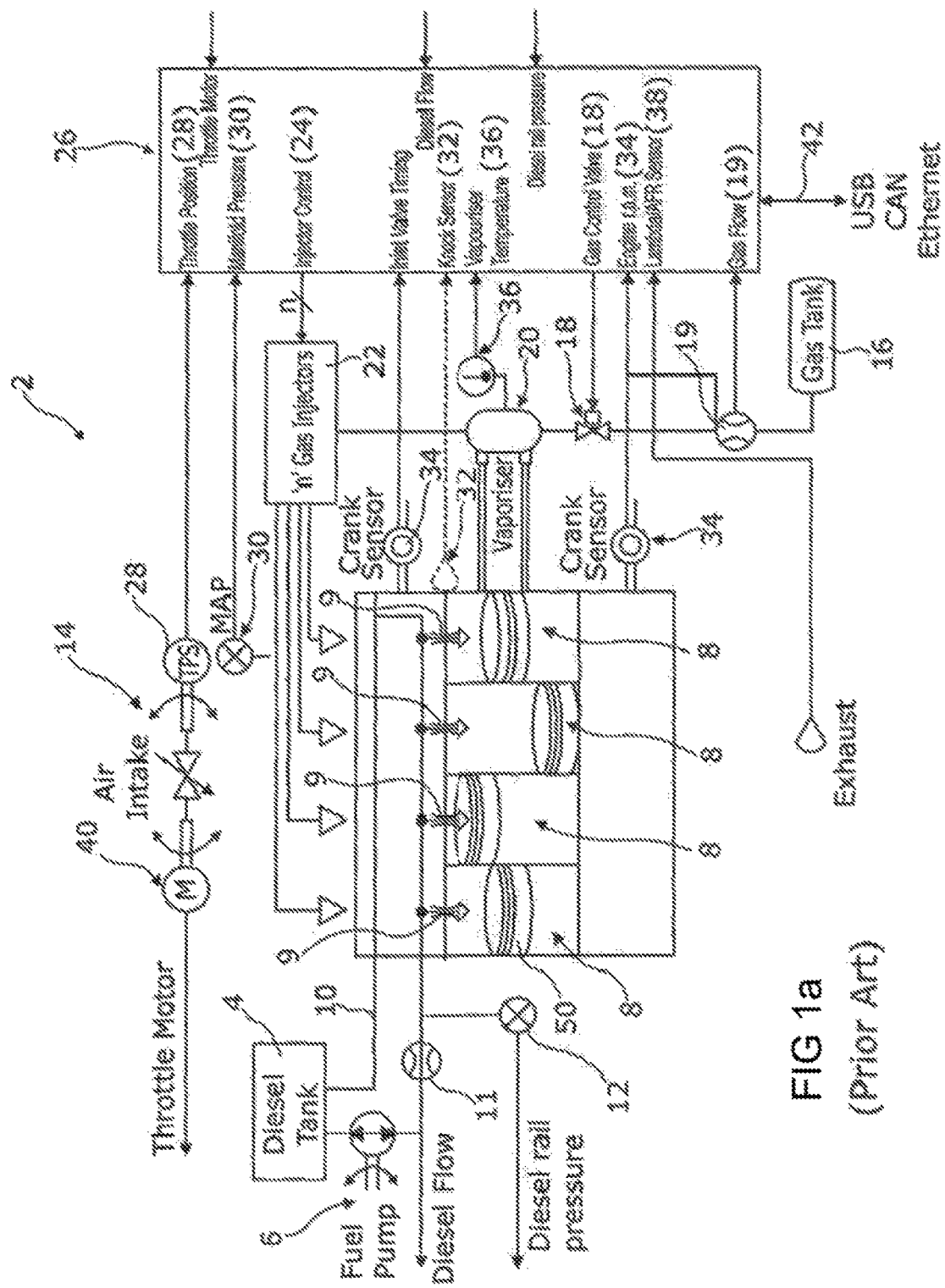
FIG. 1a (prior art) is a schematic of a conventional dual fuel engine.
Figure 1B:
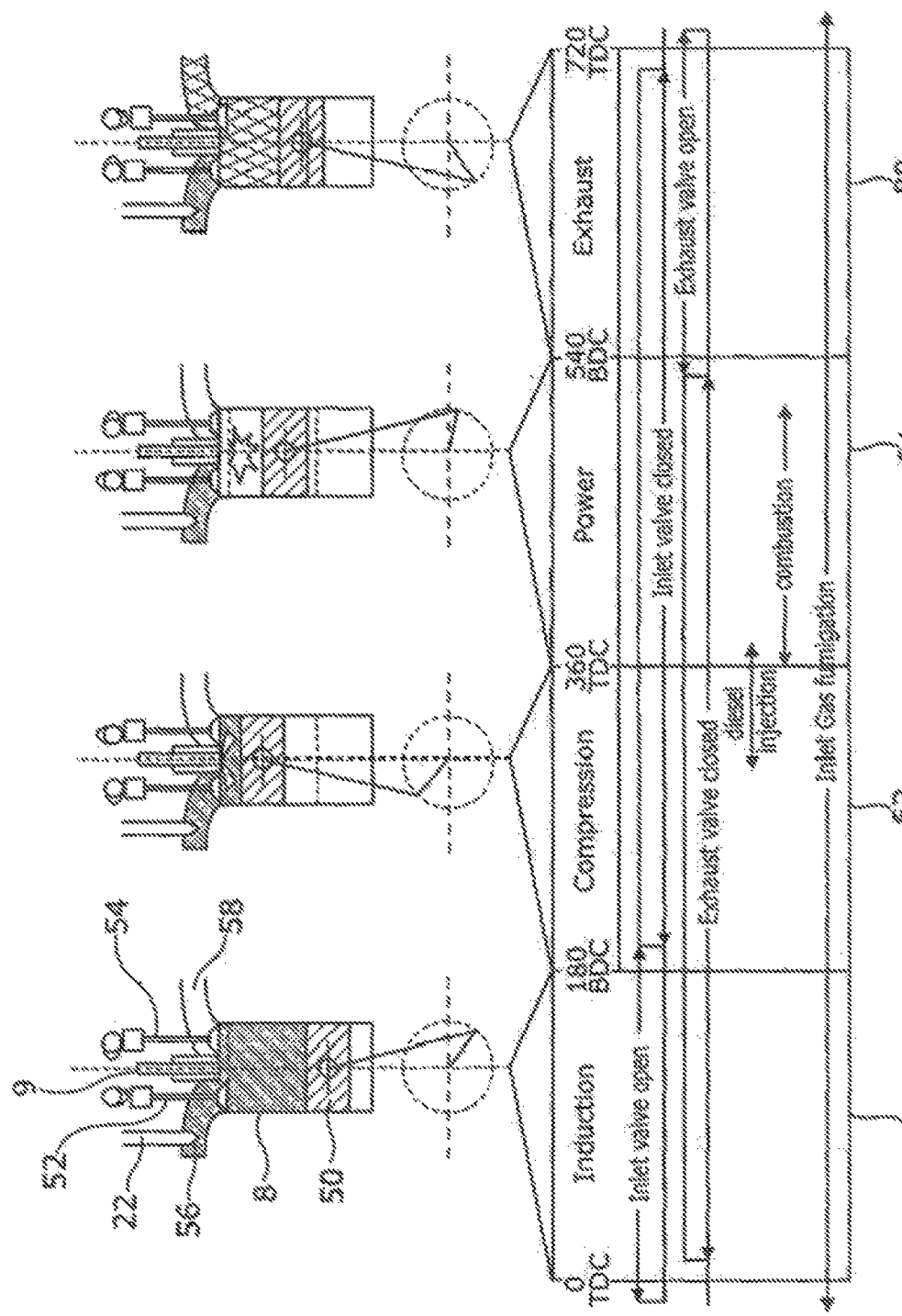
FIG. 1b (prior art) illustrates a combustion cycle for a conventional dual fuel engine.

The present invention is based on a dual fuel engine for use in a vehicle of a type already described with reference to FIGS. 1a and 1b. The primary fuel used in the engine in this embodiment is diesel fuel and the secondary fuel used in the engine in this embodiment is LPG. In addition to the features shown in FIG. 1a, the present invention is arranged so that the new ECU fitted in the dual fuel engine conversion (in addition to the OEM ECU of the vehicle) utilises one or more signals from the OEM MAF sensor 100 of the vehicle to control, at least partially, the injection duration of the LPG into the engine cylinders. The use of the MAF sensor data is in addition to the use of the data by the OEM ECU for controlling, at least partially, the diesel fuel supply to the engine.

The OEM MAF sensor 100 is fitted to the suction side of a combustion air inlet manifold 102. The main function of the OEM MAF sensor is to measure the mass of air entering the engine for combustion purposes. The OEM ECU conventionally uses the mass of air data from the OEM MAF sensor to provide a flow of air calculation and, together with other sensor input data, is used to control the flow rate of diesel into the engine dependent on the load of the engine. Various original equipment manufacturer (OEM) engine sensors are already monitored by the OEM ECU to determine the load profile of the engine. The OEM ECU can monitor the sensors directly or monitoring can be undertaken via the on-board diagnostic (OBD) socket as Controller area network (CAN) data.

Figure 2:
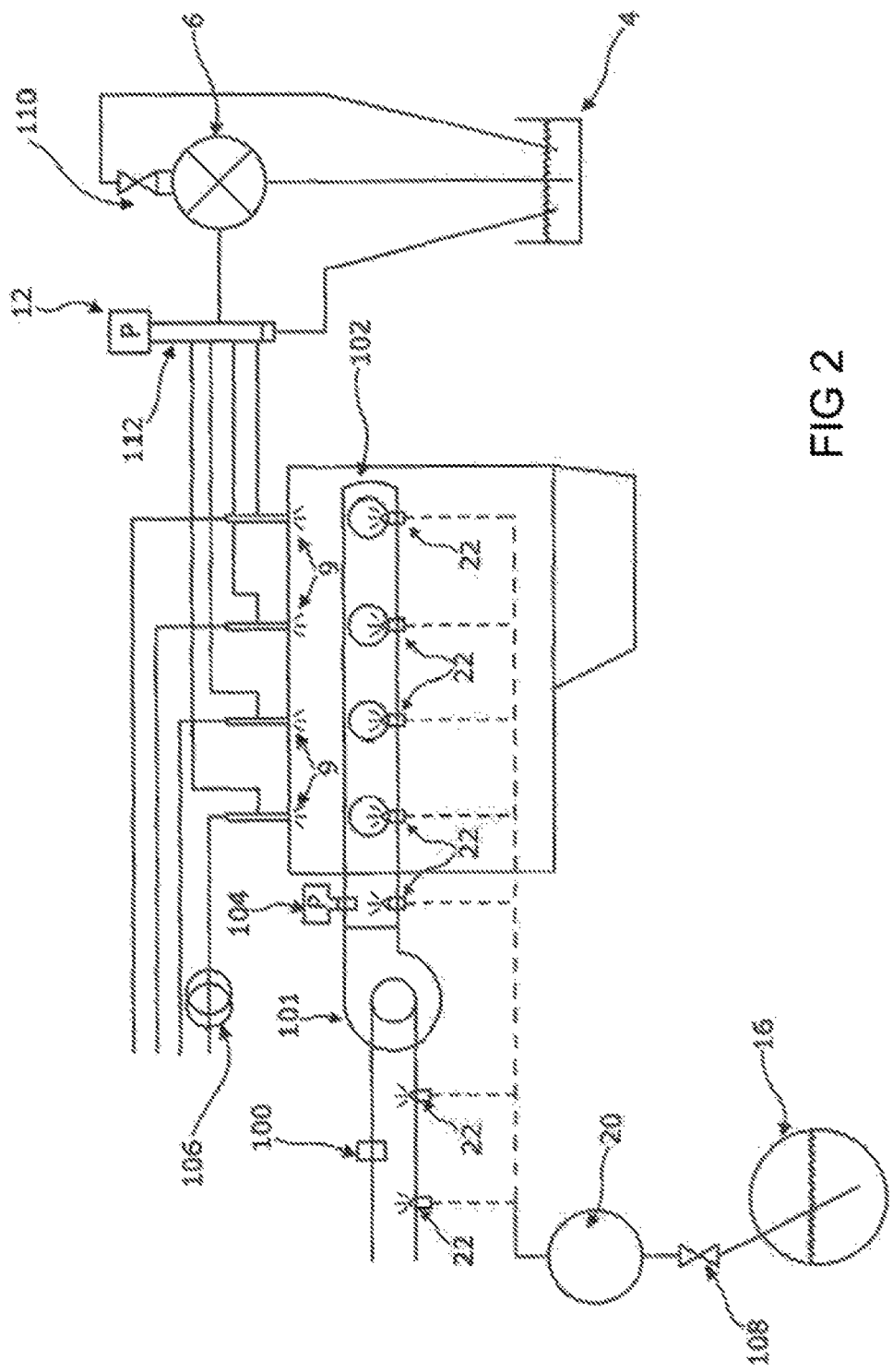
FIG. 2 is a simplified schematic of a dual fuel engine according to an embodiment of the present invention.

With reference to FIG. 2, the key features of the present invention are shown. The same features shown in FIGS. 1a and 1b are referred to using the same reference numerals. One or more LPG injectors 22 can be located in front of (or upstream) of a turbo charger 101, between the LPG vaporiser 20 and the turbo charger 101. Alternatively, or in addition, one or more LPG injectors 22 can be located in a combustion air manifold 102 that supplies the air/fuel mixture to the engine cylinders.

Figure 3:
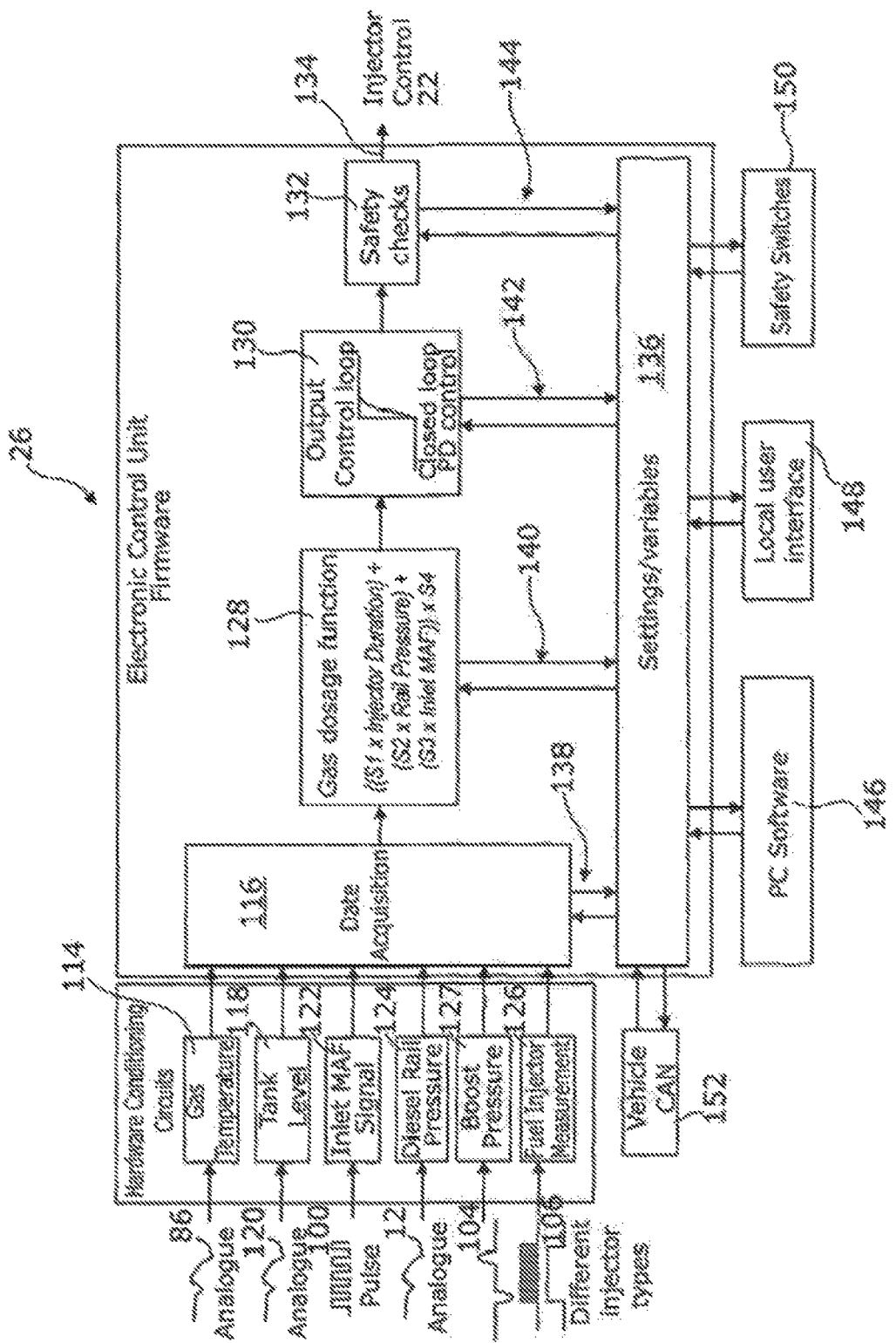
FIG. 3 is a simplified schematic of some of the main communication paths between the dual fuel engine conversion ECU fitted and the OEM sensors/monitoring devices in the engine.

A boost pressure sensor 104 is also provided in the inlet manifold of the turbo charger and is used for measuring the pressure in the inlet manifold on the pressure side of the turbo charger 101. A current clamp 106 is provided and is used to measure the diesel fuel injection duration 126, as shown in FIG. 3. A LPG shut off valve 108 is provided upstream of the vaporiser to allow shutting off of the LPG supply if and when required. A diesel flow control valve 110 is provided upstream of the diesel pump 6 to control the flow of diesel into the engine. The diesel feed common rail 112 is associated with the diesel rail pressure sensor 12.

FIG. 3 illustrates how one or more data signals recorded from various sensors in the engine are used to communicate with the new ECU 26 fitted in the dual engine conversion to allow control of the LPG supply and to ensure the LPG supply falls within safe parameters. Data from the sensors is fed into data acquisition means 116 in ECU 26. This data relates to the following:

Data obtained for safety reasons includes:
LPG temperature 114, typically in analogue form, taken from the LPG vaporiser thermometer 36;
the amount of LPG in the LPG tank 118, typically in analogue form, taken from an LPG tank sensor 120 associated with LPG tank 16;

Data obtained for control of the LPG supply includes:
the MAF inlet signal 122 taken from the MAF sensor 100, typically in pulse width modulation form;
the diesel rail pressure 124, typically in analogue form, taken from the diesel rail pressure sensor 12;
the diesel injector duration measurement 126, which can be in a number of different forms depending on the type of injector, typically measured by the current clamp 106; and
the boost pressure 127 taken from the boost pressure sensor 104.

The data acquired from the abovementioned sensors is then fed into software in the ECU which performs a gas calculation, as shown at 128 and as set out in more detail below, which calculates the duration of injection of the LPG into the engine cylinders. This calculation is fed into an output control loop 130 using closed loop PD control. A number of safety checks are then undertaken on the LPG injection calculation as shown at 132 using the safety data obtained from 114 and 118 measurements, prior to sending one or more control signals, as shown by arrow 134, to control the LPG injector duration 22.

Various settings/variables can be adjusted in the ECU calculation 26, as shown by 136, to bias or modify the LPG injection duration calculations to take more or less account of different sensor signals. This biasing/modification can take place by one or two way communication between the data acquisition means 116, as shown by arrows 138; the LPG injection calculation, as shown by arrows 140; the output control loop 130, as shown by arrows 142; and the safety checks, as shown by arrows 144.

The various settings/variables can be controlled remotely or on site via one or more two way communication using computer software 146, a local user interface 148, the vehicle CAN 152 and/or one or more safety switches 150.

It is to be noted that the pressure signals taken from the diesel fuel rail pressure sensor is also used by the ECU to control the amount of diesel fuel supplied to each engine cylinder. It does this by altering the signal from the OEM ECU which controls the diesel fuel supply pressure, typically so as to reduce it, and which at the same time provides to the OEM ECU an emulation signal which represents an expected sensed diesel fuel pressure of an unaltered diesel fuel supply. This typically has the effect of reducing the amount of diesel fuel supplied to an engine cylinder.

Experimental Evidence

Two trails were undertaken to test the effectiveness of the present invention. The first trial (Trial 1) undertaken used an ECU as described above but without the MAF sensor input in respect of controlling the secondary LPG fuel. The second trial (Trial 2) undertaken used an ECU and the MAF sensor input in respect of controlling the secondary LPG fuel in accordance with the present invention.

Methodology for the Two Trials

A dedicated Research and Development Ford Transit Connect T200 1.8Tdci 75 hp van (fitted with OEM common rail piezoelectric diesel injection) modified to use dual fuel, by fitting (and where necessary including wiring) the following:

- an LPG storage tank facility;
- weighing apparatus to measure LPG consumption from an 18 kg LPG bottle;
- a vaporiser to convert LPG to vapour;
- a vapour injection system to the combustion air inlet;
- an ECU for controlling the secondary fuel (in addition to the vehicle's existing ECU);
- a MAX machinery 710 fuel flow meter for measuring diesel fuel consumption.

The above vehicle was used in both trials, each of which comprises 14 test runs along a pre-determined test route of 29.3 miles, which included a 3 lane stretch of motorway in order to allow the vehicles to be driven up to speeds of 70 mph, with an average speed of 57-59 mph recorded for the trials.

Three test runs using diesel fuel only were carried out with both vehicles to allow day to day variations in traffic activity and weather conditions to be taken into account and reflected in a "diesel only" average consumption figure.

The test data from Trials 1 and 2 were compared to the initial diesel only test run data.

Results

Trial 1

The results of trial 1 are shown in Table 1. The vehicles were tested over 14 test runs (labelled 1-14 in Table 1). Columns 2-4 labelled 50.8:100, 49.47:100 and 48.11:100 represent the % cost savings for the fuels if the assumed percentage cost differential of the diesel fuel to the LPG fuel are as per the column ratios, column 5 represents the % combined average cost savings, column 6 represents the % reduction of diesel fuel used in the run compared to the diesel run only trial, column 7 represents the % thermal energy burn variance of the dual fuel test run compared to the diesel fuel only test run. It can be seen from the results that the conventional running of the dual fuel engine compared to a diesel fuel only engine resulted in a 12.30% overall cost reduction in the combined fuels used, a 46.52% reduction in the amount of diesel fuel used and a thermal energy burn variance of −2.95% (demonstrating improved efficiency over the diesel fuel only test runs).

Trial 2

The results of trial 2 are shown in Table 2. The vehicles were again tested over 14 test runs (labelled 15-28 in Table 2). The columns represent the same measured values as for table 1 and trial 1. It can be seen from the results that the running of the dual fuel engine using the MAF sensor data for controlling the supply of the secondary LPG fuel as per the present invention compared to a diesel fuel only engine resulted in a 20.69% overall cost reduction in the combined fuels used, a 66.96% reduction in the amount of diesel fuel used and a thermal energy burn variance of −8.04% (demonstrating improved efficiency over the diesel fuel only test runs).

It can be seen from comparison of the results in trails 1 and 2 that there is an 8.39% difference in the overall cost reduction in the combined fuels used when using the MAF sensor data for controlling the secondary fuel supply compared to a conventional dual fuel engine, a 20.44% reduction in the amount of diesel fuel used and a −5.98% difference in the thermal energy burn variance. The present invention therefore provides an increase in putative fuel cost savings of 68.21%, and overall reduction in diesel fuel of 43.94% and an improvement in thermal energy burn of 172.54%.

An example of a general formula that can be used for calculating the secondary fuel (i.e. LPG) gas injection duration based on MAF sensor data collected according to the present invention is provided below.

It is to be noted that the underlying principles used to create the formula for the secondary fuel injector duration output are based on the thermal efficiency and volumetric efficiency of an internal combustion engine. The difference between the energy content of the fuel consumed and the useful power extracted from the engine is known as Thermal Efficiency (TE).

Thermal efficiency (TE) is calculated as:

$$\text{Horse Power} = \frac{TE \times \text{Fuel Flow} \times BTU \text{ converted into movement}}{\text{Total } BTU}$$

Wherein Fuel Flow is measured here in pounds-per-hour
BTU is the British Thermal Unit In a four stroke natural aspirated engine, the theoretical maximum volume of air that each cylinder can ingest during the intake cycle is equal to the swept volume of that cylinder, calculated by:

$$\text{Displacement} = \pi/4 \times \text{bore}^2 \times \text{stroke} \times \text{no cylinders}$$

The actual amount of air an engine ingests compared to its theoretical maximum is called volumetric efficiency (VE). An engine operating at 100% VE is ingesting its total displacement every two crankshaft revolutions.

A fundamental determinant of how much torque an engine can produce is the mass of air it can ingest into the cylinders. The mass of air is directly proportional to a) the air density and b) the volumetric efficiency.

For a known engine displacement and RPM, it is possible to calculate the air flow at 100% VE in sea-level-standard-day cubic feet per minute as follows:

$$100\% \text{ VE Airflow } (scfm) = \frac{\text{Displacement } (ci) \times RPM}{3456}$$

3456 is the product of 1728, which is the number of cubic inches in a foot, multiplied by 2, the number of revolutions it takes for a four stroke engine to fill and empty all its cylinders. Once the horse power of an engine being generated is known, it is possible to calculate the amount of fuel that is flowing. Once the amount of fuel that is flowing is known, it is possible to calculate the amount of mass airflow required for that amount of fuel. Thus:

Mass Air Flow (pph)=Desired Mixture Strength (pph)×Fuel Flow (pph)

Where pph=pounds per hour

It is accepted within the automotive industry that a given engine will achieve its best power on a mixture strength of approximately 12.5 parts of air to one part of fuel (gasoline) by weight. Other fuels have different best-power-mixture values. Diesel and LPG are two fuels used in this example and they have best-power-mixture values of:

Diesel: 14.7
LPG: 15.6

The above data is then used to create the equation below for calculating the desired LPG dosage based on a particular airflow. If it assumed the engine will operate at 100% volumetric efficiency (VE), it is possible to take the incoming mass airflow sensor measurement data and translate this into a desired LPG delivery. The LPG delivery (as a flow) can then be used to calculate the desired LPG injector open time.

The incoming signal from the vehicle is a pulse width modulation frequency signal. The frequency of this signal is directly proportional to the amount of air flowing into the engine in grams per second. This frequency is converted into a reading in pounds-per-hour:

i.e. Mass Air Flow (frequency)→Total Mass Airflow (g/s)→Total Mass Airflow (pph)

Using the desired fuel replacement ratio it is possible to calculate the amount of mass airflow that should be used during LPG combustion.

LPG Mass Air Flow (pph)=Total Mass Airflow (pph)×Desired Fuel Ratio

Using the mass airflow value and the power-mixture-value, a target LPG fuel flow can be calculated.

LPG Flow (pph)=Total Mass Air Flow for LPG (pph)×15.6

Using data captured during testing, a calibration to convert LPG injector open time into fuel was created. This has then been used to convert this fuel flow into an injector open time.

LPG Open Time=LPG Flow (pph)×Conversion Figure

Combining all these elements into a single equation results in the required formula below:

LPG Injection Duration Time (milliseconds)=(MAF× Scalar)+Offset)×Mixture×LPG Ratio×LPG Cal Where:
MAF=MAF sensor measurement value;
LPG Injection Duration=length of time a LPG injector needs to be open in order to deliver the desired amount of LPG to a cylinder of the engine in use;
Scalar, Offset=MAF frequency to pounds-per-hour conversion;
Mixture=best power-mixture-value for the LPG;
LPG ratio=Desired fuel ratio (user configurable)
LPG Cal=Fuel flow in pounds-per-hour to injector open time (milliseconds) calibration.

Using the above equation, it is possible to take incoming MAF signals and a desired fuel ratio and directly convert this to an open duration time for the LPG fuel injector.

The user has access to a single value, the LPG ratio. This value controls the target fuel mixture ratio.

The above equation can be constructed in a more generic way as set out below.

Gas Equation

The overall gas injector or secondary fuel injector duration is derived from a number of engine sensor inputs. The calculation is presented below.

Value1=(MAF signal measurement−Offset1)×Scalar1

Value2=(Diesel or primary fuel Rail Pressure−Offset2)×Scalar2

Value3=(Diesel or primary fuel Injector Duration−Offset3)×Scalar3

Calculated Output Value=(Value1+Value2+Value3)× Scalar4

Where:
Scalar1=MAF Multiplier
Offset1=MAF Offset
Scalar2=Diesel Rail pressure multiplier
Offset2=Diesel Rail pressure offset
Scalar3=Diesel Injector duration multiplier
Offset3=Diesel Injector duration offset
Scalar4=Global scalar Conversion from the Calculated Output Value to an Injector Output Duration (in seconds) requires multiplication by a scalar based on the hardware platforms time constant, as shown below.

Injector Output Duration=Calculated Output Value× HardwareTimeScalar

For completeness a worked example of this process is shown in the following section.

LPG Worked Example

Inlet Mass Air Flow Sensor Output: 5500 Hz (or grams per second equivalent)

Diesel Rail Pressure Sensor Value: 1300 mili Volts (or PSI equivalent)

Diesel Injector duration: 1300 microseconds.
Scalar1=5
Offset1=3000
Scalar2=15
Offset2=1000
Scalar3=0.5
Offset3=1000
Scalar4=23
Hardware Time Scalar=0.00002

Value1=(5500−3000)×5

Value1=12,500

Value2=(1300−1000)×15

Value2=4,500

Value3=(1300−1000)×0.5

Value3=150

Calculated LPG Output Value=(12,500+4,500+150)×23

Calculated LPG Output Value=394,450

LPG Injector Output Duration=394,450×0.00002

LPG Injector Output Duration=7.889 ms

The invention claimed is:

1. A multi-fuel engine, said multi-fuel engine comprising:
a primary fuel supply and at least one secondary fuel supply, the primary and at least one secondary fuel supplies being arranged to mix a primary fuel and a secondary fuel with each other and with air for combustion in one or more cylinders of the multi-fuel engine in use;
one or more electronic control units arranged to control one or more supply characteristics of the primary fuel, the secondary fuel, or both the primary and the secondary fuels in use;
said multi-fuel engine including a mass air flow (MAF) sensing means fitted to a suction side of a combustion air inlet means of the multi-fuel engine, at least one of the one or more electronic control units being arranged to receive one or more signals from the mass air flow sensing means to control, at least partially, one or more supply characteristics of the primary fuel supply;
at least one of the one or more electronic control units and a further electronic control unit is arranged to receive one or more signals from the mass air flow sensing means to control, at least partially, one or more supply characteristics of the at least secondary fuel supply, wherein the secondary fuel is injected into an air intake stream for the one or more cylinders of the multi-fuel engine upstream of the mass air flow sensing means.

2. A multi-fuel engine according to claim 1, wherein the mass air flow sensing means is at least one of a vane meter sensor and a hot wire sensor.

3. A multi-fuel engine according to claim 1, wherein at least one of the one or more electronic control units and further electronic control unit receives the one or more signals directly from the mass air flow sensing means, or indirectly via vehicle control area network data.

4. A multi-fuel engine according to claim 1 wherein the primary fuel is diesel.

5. A multi-fuel engine according to claim 1, wherein the secondary fuel includes at least one fuel selected from the group consisting of a combustible gas, a liquid petroleum gas, and a compressed natural gas.

6. A multi-fuel engine according to claim 1, wherein the one or more supply characteristics of the secondary fuel that are controlled, at least partially, includes at least one of a volume of the secondary fuel being injected and a duration of injection of the secondary fuel.

7. A multi-fuel engine according to claim 1, further comprising one or more sensing means other than the mass air flow sensing means for allowing control of one or more of the supply characteristics of the primary fuel, the secondary fuel, or both the primary and secondary fuels, said one or more sensing means being selected from the group consisting of: a fuel line pressure monitoring means, a primary or diesel rail pressure sensor means, a primary or diesel fuel injection duration sensor/timing means, and a boost pressure sensing means.

8. A multi-fuel engine according to claim L wherein at least one of the electronic control units and further electronic control unit undertakes one or more safety checks in respect of delivery of the secondary fuel in the multi-fuel engine, said one or more safety checks being selected from the group consisting of: measuring a temperature of the secondary fuel, measuring a temperature at a secondary fuel vaporising means, measuring an amount of the secondary fuel in a secondary fuel reservoir from which the secondary fuel is supplied in use, and measuring a boost pressure using a boost pressure sensing means located in an inlet manifold of a turbo charger associated with the one or more cylinders.

9. A multi-fuel engine according to claim 1, wherein at least one of formulae, calculations and algorithms are used by the at least one of the electronic control units and further electronic control unit to calculate one or more supply characteristics of the secondary fuel in use, wherein the at least one of formulae, calculations and algorithms use data from one or more sensing means of the multi-fuel engine and apply at least one of a weighting effect, a biasing effect, a scalar value, and an offset value to the data to calculate the one or more supply characteristics of the secondary fuel in use.

10. A multi-fuel engine according to claim 9, wherein the at least one of the electronic control units and further electronic control units calculate a supply characteristic of the secondary fuel that is proportional to a mass of air flow being measured by the mass air flow sensing means.

11. A multi-fuel engine according to claim 1, wherein dampening means are applied to sensing means output from the at least one of the electronic control units and further electronic control unit for controlling at least one of an injection duration for the secondary fuel supply and another supply characteristic of the secondary fuel supply in order to dampen a reaction time associated with signal variation output wherein the dampening means includes one or more values, scalar values, and offset values fed into one or more formulae, calculations, and algorithms performed by the at least one of the electronic control units and further electronic control unit to measure the injection duration for the secondary fuel supply and the another supply characteristic of the secondary fuel supply.

12. A multi-fuel engine according to claim 1, wherein the multi-fuel engine is used in an application selected from the group consisting of an automotive application, a vehicle, a car, a lorry and a van.

13. A multi-fuel engine according to claim 1, wherein an original equipment manufacturer electronic control unit is provided and a further electronic control unit is provided, the further electronic control unit is arranged to control a pressure of the primary fuel supply by altering a signal from the original equipment manufacturer electronic control unit which controls the pressure of the primary fuel supply, so as to reduce the pressure, and which at the same time provides to the original equipment manufacturer electronic control unit an emulation signal which represents an expected sensed primary fuel pressure of an unaltered primary fuel supply.

14. A multi-fuel engine according to claim 9, wherein at least one of the formulae, calculations and algorithms used by at least one of the electronic control units and further electronic control unit to measure the duration time for which the secondary fuel injector means is open for each cylinder cycle in the multi-fuel engine is:

SF Injection Duration Time (milliseconds)=(MAF×Scalar)+Offset)×Mixture×SF Ratio×SF Cal Where:
MAF=MAF sensor measurement value;
Secondary Fuel (SF) Injection Time=length of duration of time a secondary fuel injector means needs to be open in order to deliver the desired amount of secondary fuel to a cylinder, per cylinder cycle of the engine in use;
Scalar, Offset=MAF frequency to Kg/h (pounds-per-hour) conversion;
Mixture=best power-mixture-value for the secondary fuel;
SF ratio=Desired secondary fuel ratio (user configurable)
SF Cal=Fuel flow in Kg/h (pounds-per-hour) to injector open time (milliseconds) calibration.

15. A multi-fuel engine according to claim 9, wherein at least one of the formulae, calculations, and algorithms used by at least one of the electronic control units and further electronic control unit to measure the duration time for which the secondary fuel injection means is open for each cylinder cycle in the multi-fuel engine is:

$$\text{Calculated Output Value} = (\text{Value 1} + \text{Value 2} + \text{Value 3}) \times \text{Scalar 4}$$

Wherein:

$$\text{Value 1} = (\text{MAF} - \text{Offset 1}) \times \text{Scalar 1}$$

$$\text{Value 2} = (\text{Primary Fuel Rail Pressure} - \text{Offset 2}) \times \text{Scalar 2}$$

$$\text{Value 3} = (\text{Primary Fuel Injection Duration} - \text{Offset 3}) \times \text{Scalar 3}$$

Where:
Scalar 1=MAF Multipler
Offset 1=MAF Offset
Scalar 2=Primary Fuel Rail pressure multiplier
Offset 2=Primary Fuel Rail pressure offset
Scalar 3=Primary Fuel Injection duration multiplier
Offset 3=Primary Fuel Injection duration offset
Scalar 4=Global scalar
And wherein:

$$\text{Secondary Injector Means Output Duration} = \text{Calculated Output Value} \times \text{Hardware Time Scalar.}$$

16. A method of controlling a multi-fuel engine, said multi-fuel engine comprising a primary fuel supply and at least a secondary fuel supply, the primary and at least secondary fuel supplies being arranged to mix a primary and a secondary fuel with each other, and with air for combustion in one or more cylinders of the engine in use, one or more electronic control units are provided to control one or more supply characteristics of the primary fuel, the secondary fuel, or both the primary and the secondary fuels in use, said method including the steps of:
measuring mass air flow in the engine using a mass air flow sensing means fitted to a suction side of a combustion air inlet means of the multi-fuel engine,
using the mass air flow measurement to control, at least partially, one or more supply characteristics of the primary fuel via one of the electronic control units,
using the mass air flow measurements to control, at least partially, one or more supply characteristics of the secondary fuel using at least one of the electronic control units and a further electronic control unit wherein the at least one secondary fuel is injected into an air intake stream for the one or more cylinders of the multi-fuel engine upstream of the mass air flow sensing means.

* * * * *